(12) United States Patent
Chen et al.

(10) Patent No.: US 9,244,255 B2
(45) Date of Patent: Jan. 26, 2016

(54) MINIATURE IMAGE PICKUP LENS

(71) Applicant: Kinko Optical Co., Ltd., Taichung (TW)

(72) Inventors: Sze-Ying Chen, Taichung (TW); Yi-Fang Chen, Taichung (TW)

(73) Assignee: KINKO OPTICAL CO., LTD., Taichung (TW)

( * ) Notice: Subject to any disclaimer, the term of this patent is extended or adjusted under 35 U.S.C. 154(b) by 75 days.

(21) Appl. No.: 13/845,691

(22) Filed: Mar. 18, 2013

(65) Prior Publication Data

US 2014/0268369 A1    Sep. 18, 2014

(51) Int. Cl.
*G02B 3/02* (2006.01)
*G02B 13/18* (2006.01)
*G02B 9/60* (2006.01)
*G02B 13/00* (2006.01)

(52) U.S. Cl.
CPC .............. *G02B 13/0045* (2013.01); *G02B 9/60* (2013.01)

(58) Field of Classification Search
CPC ...... G02B 13/001; G02B 13/006; G02B 9/60; G02B 9/62; G02B 13/0015; G02B 13/002; G02B 13/0045
USPC .................. 359/714, 770, 781, 782, 783, 715
See application file for complete search history.

(56) References Cited

U.S. PATENT DOCUMENTS

| | | | | |
|---|---|---|---|---|
| 7,486,449 B2 * | 2/2009 | Miyano | ......................... | 359/781 |
| 7,639,432 B2 * | 12/2009 | Asami | ......................... | 359/770 |
| 7,933,078 B2 * | 4/2011 | Jung | ...................... | G02B 9/62 |
| | | | | 359/713 |
| 7,961,408 B2 * | 6/2011 | Lo et al. | ........................ | 359/753 |
| 2009/0009888 A1 * | 1/2009 | Asami | ......................... | 359/770 |
| 2011/0102541 A1 * | 5/2011 | Jin | .......................... | G02B 9/60 |
| | | | | 348/36 |

FOREIGN PATENT DOCUMENTS

CN    102360114 A    2/2012

* cited by examiner

*Primary Examiner* — Zachary Wilkes
*Assistant Examiner* — Collin X Beatty
(74) *Attorney, Agent, or Firm* — Muncy, Geissler, Olds and Lowe P.C.

(57) ABSTRACT

A miniature image pickup lens includes a first lens, a second lens, an aperture, a third lens, a fourth lens, and a fifth lens in sequence along an optical axis from an object side to an image side. The first lens is a negative meniscus lens with a convex aspheric surface toward the object side and a concave aspheric surface toward the image side. The second lens has both aspheric surfaces including a convex surface toward the object side. The third lens is a positive biconvex lens. The fourth lens is a positive biconvex lens. The fifth lens is a negative lens with a concave surface toward the object side.

9 Claims, 12 Drawing Sheets

MINIATURE IMAGE PICKUP LENS

BACKGROUND OF THE INVENTION

1. Field of the Invention

The present invention relates generally to an optical lens, and more particularly to a miniature image pickup lens.

2. Description of the Related Art

With the thriving development of portable devices, the market demand for digital image capture modules are continuously growing. In consideration of portability and convenience, it is commonly expected that the digital image capture modules will become smaller and lighter without sacrificing the image quality.

There are two main types of image sensors applied on the conventional image capture modules, which are charge coupled device (CCD) and complementary metal oxide semiconductor (CMOS). CMOS has become the most widely used image sensors in the market of portable devices because of its low cost, low power consumption, and high integration. In addition, due to the advancement in semiconductor manufacturing technology, the size of a pixel has greatly reduced, and therefore an image sensor is able to provide images with higher resolution. But the reduction of pixel size also means that the luminosity captured by an image sensor is less, so some kind of systems of lenses are needed to increase luminosity to reduce the influences of noises.

Along with these image devices becoming smaller, the sizes of aforementioned image capture devices and the lenses applied on the aforementioned image devices are greatly reduced too. The lenses for such image capture modules are requested to have smaller size and higher optical performance as well. As a result, size and optical performance are two indispensable considerations for the lenses of image devices.

Besides, the lenses with small sizes used in image devices are being developed toward wider angles, but such wide-angled systems tend to have problems of distortion and chromatic aberration. Moreover, in consideration of lowering cost, the manufacturers usually use plastic lenses instead of glass ones, but the plastic lenses are more sensitive to temperature, so that the image capture modules with plastic lenses are easily affected by fluctuations of temperature, and have the defect of unstable image quality.

SUMMARY OF THE INVENTION

The primary objective of the present invention is to provide a miniature image pickup lens which is composed by five lenses, and the miniature image pickup lens meets the demand to be smaller and capture higher luminosity. It further ameliorates the problems of distortion and chromatic aberration which are usually happened in wide-angled systems, and it is more insensitive to temperature.

According to the objectives of the present invention, a miniature image pickup lens includes a first lens, a second lens, an aperture, a third lens, a fourth lens, and a fifth lens arranged in sequence along an optical axis from an object side to an image side, wherein the first lens is a negative meniscus lens with a convex aspheric surface toward the object side and a concave aspheric surface toward the image side; the second lens has a convex surface toward the object side, and both surfaces are aspheric; the third lens is a positive biconvex lens; the fourth lens is a positive biconvex lens; and the fifth lens is a negative lens with a concave surface toward the object side.

Therefore, the miniature image pickup lens of the present invention is miniaturized, able to capture wide-angled images, and the captured images have less optical distortion and higher optical performance.

DETAILED DESCRIPTION OF THE INVENTION

[First Preferred Embodiment]

Figure 1:
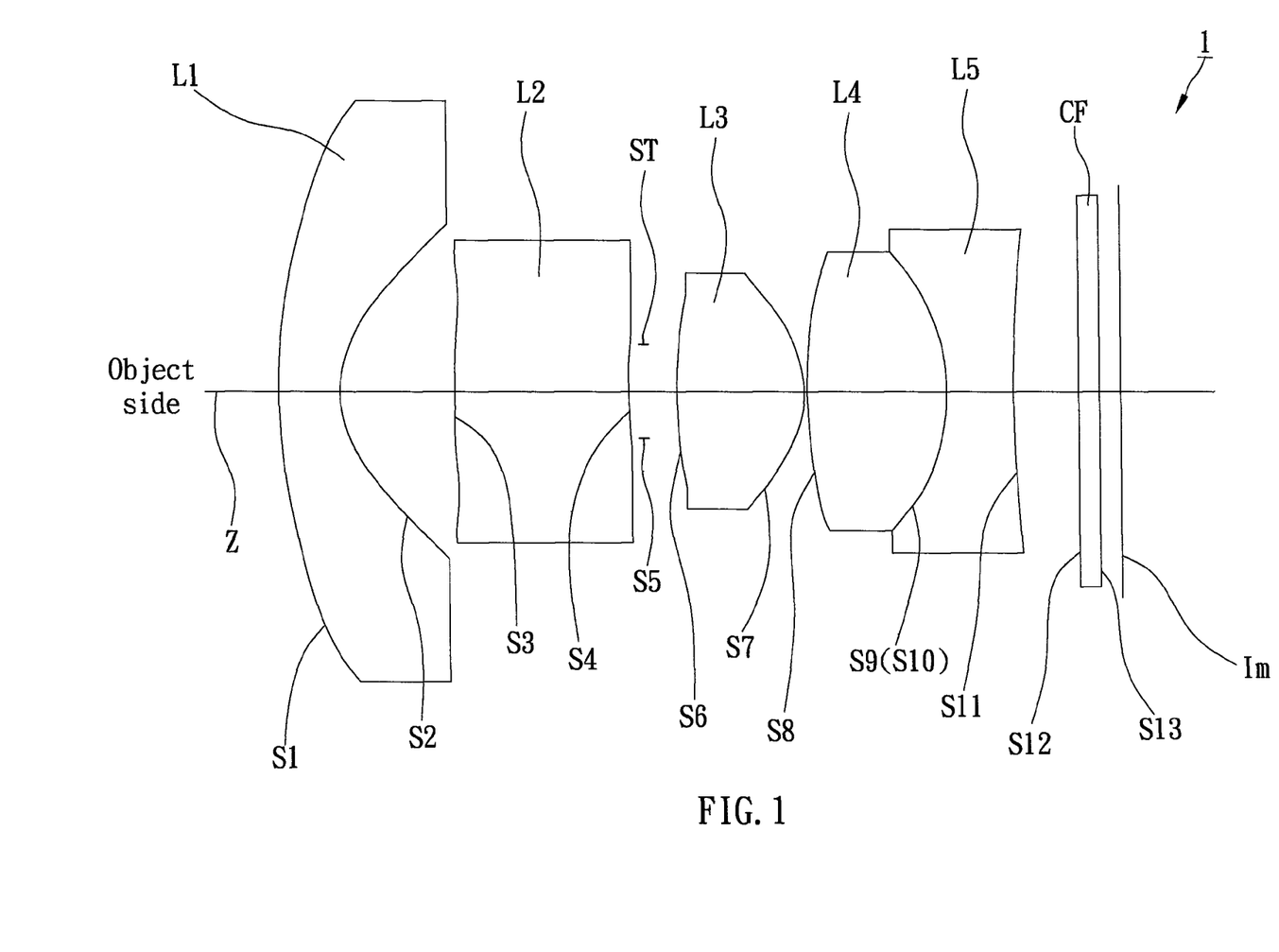
FIG. 1 is a sketch diagram of the arrangement of the lenses of a first preferred embodiment of the present invention.

FIG. 1 shows an arrangement of a miniature image pickup lens 1 of the first preferred embodiment of the present invention, which includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, which makes the miniature image pickup lens 1 wide-angled. Both the convex surface S1 and the concave surface S2 of the first lens L1 are aspheric, and the reason for applying such aspheric surfaces is to correct the distortion, which happens easily for the miniature image pickup lens 1 designed as wide-angled.

The second lens L2 is a plastic positive meniscus lens with a convex surface S3 towards the object side and a concave surface S4 towards the image side Im, and both the convex surface S3 and the concave surface S4 are aspheric. The structure of the second lens L2 is helpful to correct the distortion as well, and also the chromatic aberration caused by the first lens L1.

The aperture ST is set between the second lens L2 and the third lens L3 to lower the angle incident to the image side Im of the light which enters the miniature image pickup lens 1. Consequently, the lower incident angle effectively increases the luminosity on the image side Im, and therefore the distance between the image side Im and the lenses L1-L5 could be shortened, so that the miniature image pickup lens 1 could be miniaturized. In addition, the aperture ST set between the second lens L2 and the third lens L3 symmetrizes the arrangements of the lenses at the opposite sides of the aperture ST, and therefore lowers the sensitivity while manufacturing the miniature image pickup lens 1.

The third lens L3 is a plastic positive biconvex lens with two aspheric convex surfaces S6 and S7. The third lens L3 provides the main refractive power of the entire optical system of the miniature image pickup lens 1.

The fourth lens L4 is a glass positive biconvex lens with two spherical convex surfaces S8 and S9. Due to the fourth lens L4 is a positive lens, it could effectively shorten the total length of the miniature image pickup lens 1 by proper coordinating with the other lenses L1-L3 and L5.

The fifth lens L5 is a glass negative biconcave lens with two spherical concave surfaces S10 and S11, in which the surface S10 is towards the object side and the surface S11 is towards the image side Im. In addition, the surface S10 is jointed to the surface S9 of the fourth lens L4 to form a compound lens. Due to the fifth lens L5 is a negative lens while the fourth lens L4 is a positive one, this compound lens could effectively ameliorate the problem of chromatic aberration which may happen for the miniature image pickup lens 1, and therefore enhance the optical performance of the miniature image pickup lens 1.

The miniature image pickup lens 1 of the present invention further satisfies the following conditions:

$0.1 < f/TTL < 0.2;$  1)

$0.5 < f/f_3 < 2;$  2)

$vd_4 - vd_5 > 20;$  3)

wherein:

f is a total focal length of the miniature image pickup lens 1;

TTL is a total length of the miniature image pickup lens 1;

$f_3$ is a focal length of the third lens L3;

$vd_4$ is a dispersion index of the fourth lens L4; and $vd_5$ is a dispersion index of the fifth lens L5.

Through the condition 1, the miniature image pickup lens 1 could have the advantages of wide-angle and short total length. The condition 2 is applied to control the main refractive power of the entire optical system of the miniature image pickup lens 1 via the third lens L3. The condition 3 could effectively eliminate the chromatic aberration of the miniature image pickup lens 1 and enhance the image quality by designing the dispersion indexes of the fourth lens L4 and the fifth lens L5.

In order to achieve the aforementioned purposes and enhance the optical performance of the miniature image pickup lens 1, Table 1 shows the specifications of the miniature image pickup lens 1 of the first preferred embodiment, including the total focal length of the miniature image pickup lens 1 (f), the total length of the miniature image pickup lens 1 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 1

| | f = 3.64 mm | | | |
| | TTL = 25.35 mm | | | |
| Side | R (mm) | D (mm) | Nd | Vd | |
| --- | --- | --- | --- | --- | --- |
| S1 | 18.5 | 1.85 | 1.54 | 56 | L1 |
| S2 | 3.3 | 3.48 | | | f1 = −7.7 mm |
| S3 | 29.9 | 5.19 | 1.62 | 26 | L2 |
| S4 | 46.9 | 0.41 | | | f2 = 119.2 mm |
| S5 | ∞ | 1.01 | | | ST |
| S6 | 22.6 | 3.79 | 1.54 | 56 | L3 |
| S7 | −3.3 | 0.09 | | | f3 = 5.7 mm |
| S8 | 13.0 | 4.18 | 1.6 | 68 | L4 |
| S9 | −5.9 | 0.00 | | | f4 = 7.4 mm |
| S10 | −5.9 | 2.01 | 1.92 | 19 | L5 |
| S11 | 38.4 | 2.00 | | | f5 = −5.3mm |
| S12 | ∞ | 0.60 | | | CF |
| S13 | ∞ | 0.64 | | | |

In this first preferred embodiment, the sag z of the aspheric surfaces S1, S2, S3, S4, S6, and S7 could be obtained by the following equation:

$$z = \frac{ch^2}{1 + \sqrt{1-(1+k)c^2h^2}} + \alpha_2 h^4 + \alpha_3 h^6 + \alpha_4 h^8 + \alpha_5 h^{10} + \alpha_6 h^{12} + \alpha_7 h^{14} + \alpha_8 h^{16}$$

wherein:

z is the sag of the aspheric surface;

c is the curvature of the surface;

h is the semi-diameter of the surface;

k is conic constant;

$\alpha_2$-$\alpha_8$ are coefficients of each order of the semi-diameter h on the surface.

In this first preferred embodiment, the conic constants (k) and the coefficients of each order $\alpha_2$-$\alpha_8$ of each aspheric surface are shown in Table 2.

TABLE 2

| | k | $\alpha_2$ | $\alpha_3$ | $\alpha_4$ | $\alpha_5$ | $\alpha_6$ | $\alpha_7$ | $\alpha_8$ |
| --- | --- | --- | --- | --- | --- | --- | --- | --- |
| S1 | 0.000000 | 0.000174 | −0.000010 | 0.000000 | −0.000000 | 0 | 0 | 0 |
| S2 | −0.854613 | −0.000250 | −0.000008 | −0.000004 | 0.000000 | 0 | 0 | 0 |
| S3 | −398.095496 | 0.000048 | −0.000098 | 0.000006 | −0.000000 | 0 | 0 | 0 |
| S4 | 0.000000 | 0.002952 | 0.001623 | −0.000728 | 0.000150 | 0 | 0 | 0 |
| S6 | 0.000000 | −0.001401 | 0.000447 | 0.000004 | −0.000003 | 0 | 0 | 0 |
| S7 | −0.927943 | 0.000033 | −0.000202 | 0.000041 | −0.000004 | 0 | 0 | 0 |

Figure 2A:
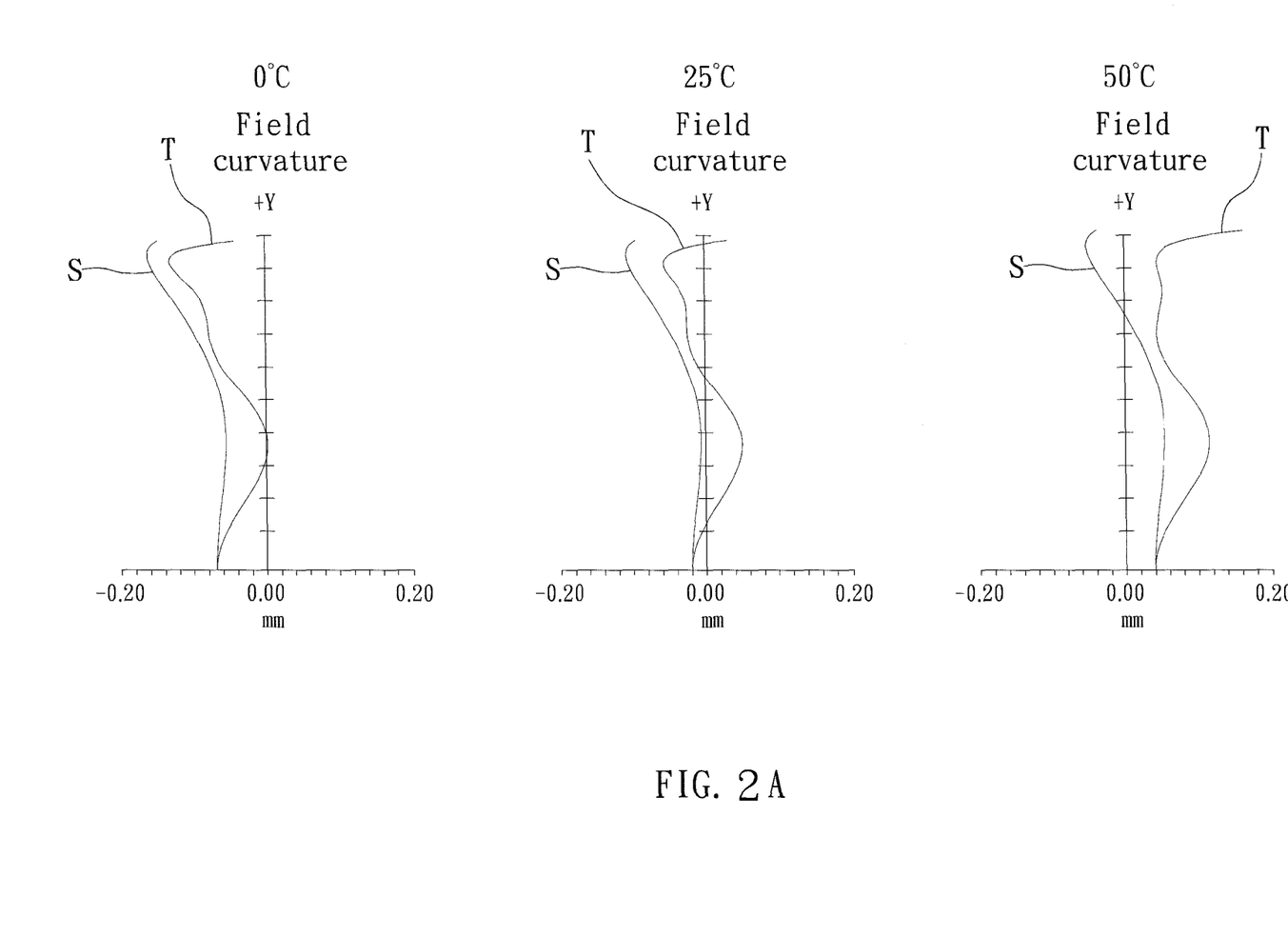
FIG. 2A shows a field curvature diagram of the first preferred embodiment of the present invention.
Figure 2B:
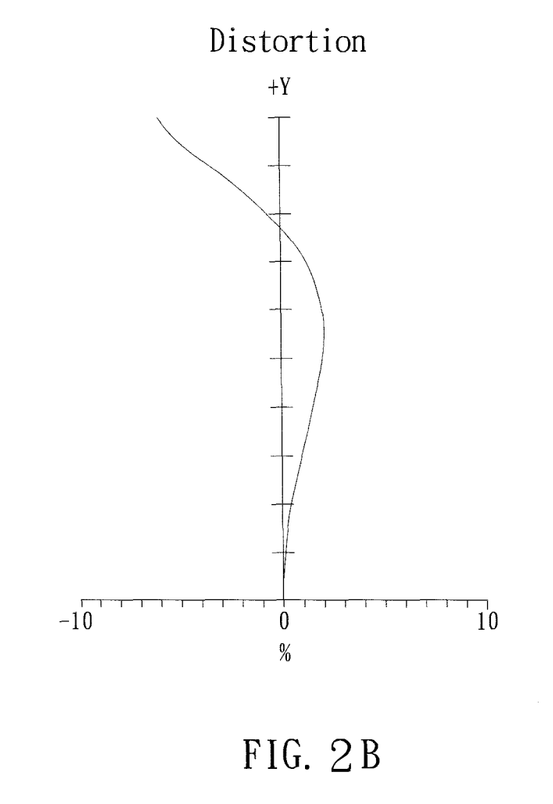
FIG. 2B shows a distortion diagram of the first preferred embodiment of the present invention.
Figure 2C:
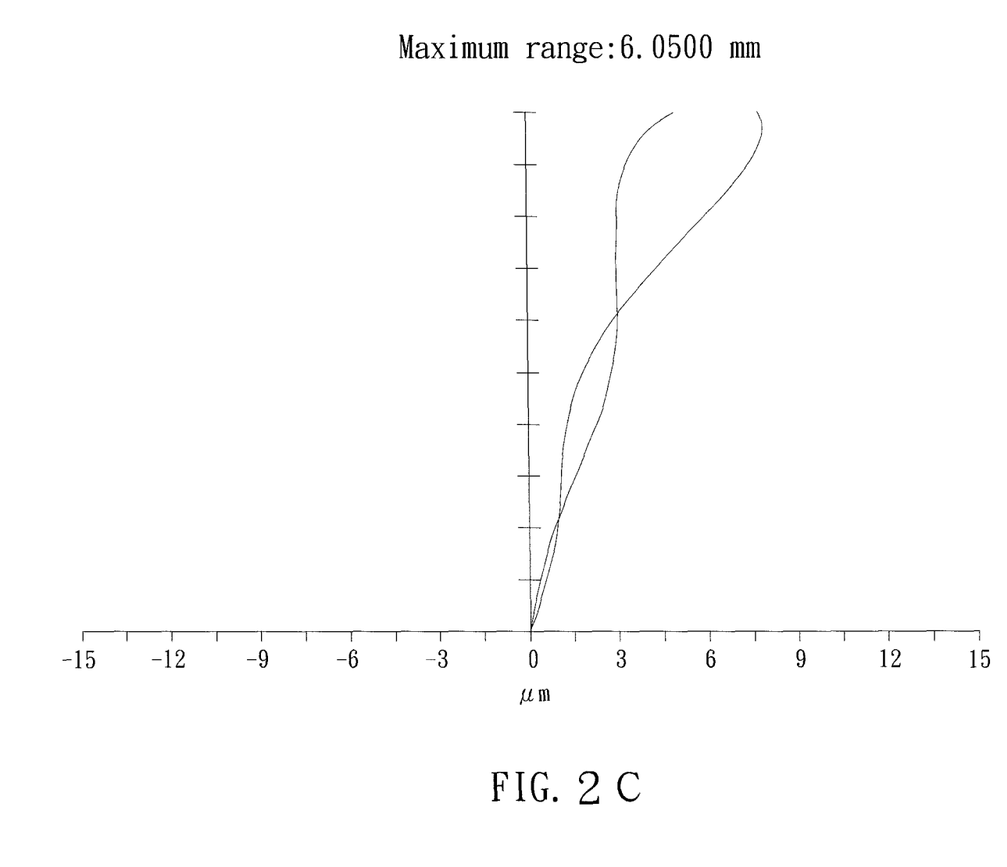
FIG. 2C shows a lateral color aberration diagram of the first preferred embodiment of the present invention.

Through the aforementioned arrangements of the lenses L1-L5 and the apertures ST, the image quality of the miniature image pickup lens 1 could satisfy the demand of the market, which could be realized via FIG. 2A to FIG. 2C. FIG. 2A shows that the maximum field curvature of the miniature image pickup lens 1 no exceeds the range from −0.16 mm to 0.02 mm at 0° C.; −0.12 mm to 0.06 mm at 25° C., and −0.06 mm and 0.16 mm at 50° C. FIG. 2B shows that the maximum distortion of the miniature image pickup lens 1 is no higher than −6% and 3%. As to FIG. 2C, it shows that the maximum lateral color aberration of the miniature image pickup lens 1 is no larger than 9 μm. The results show that the optical performance of the miniature image pickup lens 1 complies with the market standard.

[Second Preferred Embodiment]

Figure 3:
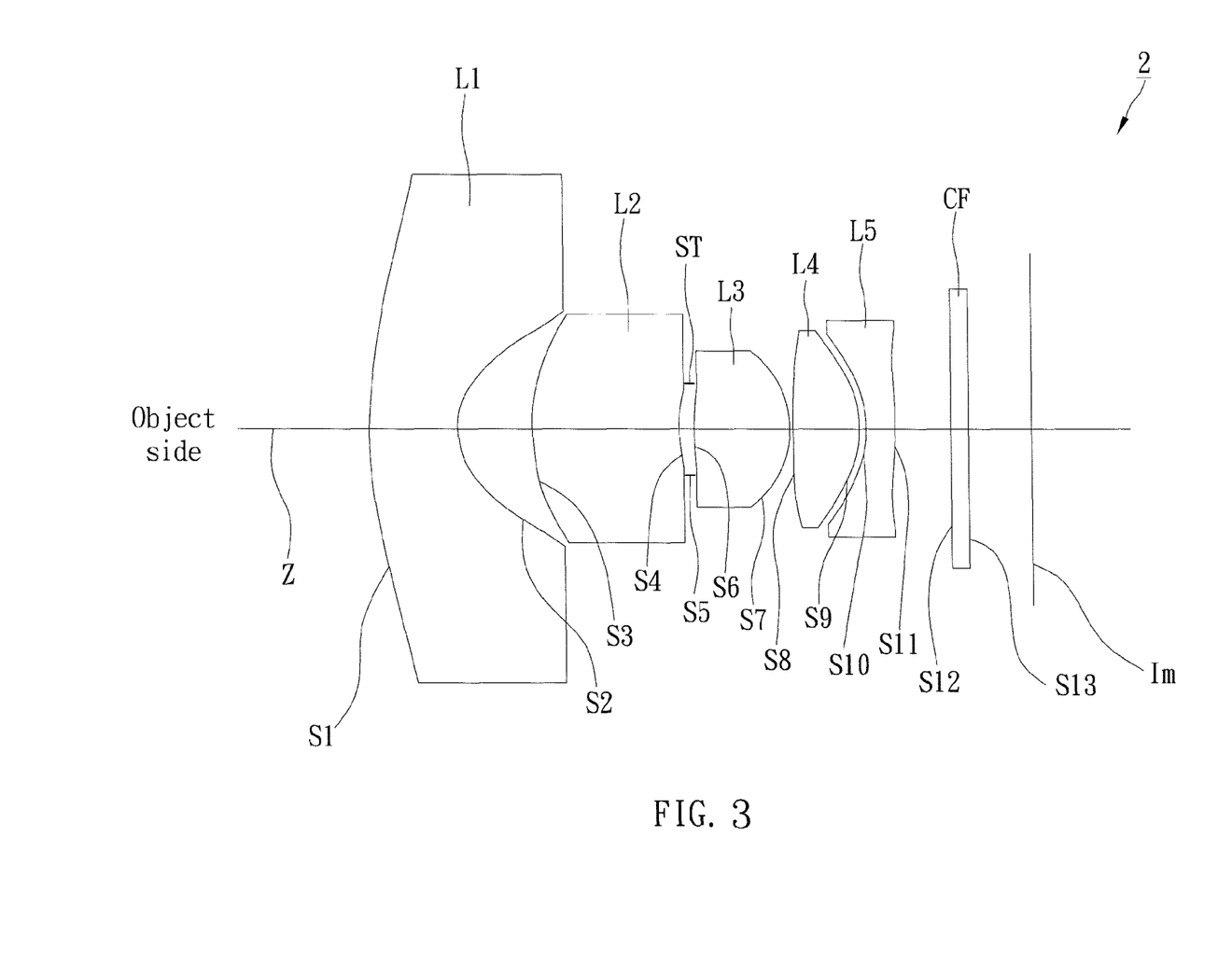
FIG. 3 is a sketch diagram of the arrangement of the lenses of a second preferred embodiment of the present invention.

As shown in FIG. 3, a miniature image pickup lens 2 of the second preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 2 wide-angled. The reason for applying such aspheric surfaces is to correct the distortion, which happens easily for the miniature image pickup lens 2 designed as wide-angled.

The second lens L2 is a plastic positive meniscus lens with a convex surface S3 towards the object side and a concave surface S4 towards the image side Im, and both the convex surface S3 and the concave surface S4 are aspheric. The second lens L2 is helpful to correct the distortion as well, and also the chromatic aberration caused by the first lens L1.

The aperture ST is set between the second lens L2 and the third lens L3, and the purpose is the same with the previous embodiment, which is to lower the angle incident to the image side Im of the light enters the miniature image pickup lens 2, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 2 while being manufactured could be lowered too.

The third lens L3 is a plastic positive biconvex lens with two aspheric convex surfaces S6 and S7, which provides the main refractive power of the entire optical system of the miniature image pickup lens 2.

The fourth lens L4 is a plastic positive biconvex lens with two aspheric convex surfaces S8 and S9. Due to the fourth lens L4 is a positive lens, it could effectively shorten the total length of the miniature image pickup lens 2 by proper coordinating with the other lenses L1-L3 and L5.

The fifth lens L5 is a plastic negative meniscus lens with a concave surface S10 towards the object side and a convex surface S11 towards the image side Im, and both the surfaces S10 and S11 are aspheric. Due to the fifth lens L5 is a negative lens while the fourth lens L4 is a positive one, these two lenses L4 and L5 could effectively ameliorate the problem of chromatic aberration which may happen for the miniature image pickup lens 2, and therefore enhance the optical performance of the miniature image pickup lens 2.

In addition to the aforementioned structures of the lenses L1-L5, the miniature image pickup lens 2 of the present invention further satisfies the following conditions, to make the miniature image pickup lens 2 have the advantages of wide-angle and short total length, and to control the main refractive power of the entire optical system, and to effectively eliminate the chromatic aberration of the miniature image pickup lens 2:

$$0.1 < f/TTL < 0.2; \quad\quad 1)$$

$$0.5 < f/f_3 < 2; \quad\quad 2)$$

$$vd_4 - vd_5 > 20; \quad\quad 3)$$

wherein:

f is a total focal length of the miniature image pickup lens 2;

TTL is a total length of the miniature image pickup lens 2;

$f_3$ is a focal length of the third lens L3;

$vd_4$ is a dispersion index of the fourth lens L4; and $vd_5$ is a dispersion index of the fifth lens L5.

In order to achieve the aforementioned purposes and enhance the optical performance of the miniature image pickup lens 2, Table 3 shows the specifications of the miniature image pickup lens 2 of the second preferred embodiment, including the total focal length of the miniature image pickup lens 2 (f), the total length of the miniature image pickup lens 2 (TTL), the radius of each lens along the optical axis Z (R), the distance between two neighboring surfaces or between the lens and the image side Im along the optical axis Z (D), the refractive index of each lens (Nd), the Abbe number (vd) of each lens; and the focal lengths of each lens (f1-f5):

TABLE 3 f = 1.8 mm  TTL = 11.7 mm

| Side | R (mm) | D (mm) | Nd | Vd | |
|---|---|---|---|---|---|
| S1 | 9 | 1.5 | 1.54 | 56 | L1 |
| S2 | 1.2 | 1.3 | | | f1 = −2.7 mm |
| S3 | 3.3 | 2.6 | 1.64 | 24 | L2 |
| S4 | 4.0 | 0.2 | | | f2 = 11.8 mm |
| S5 | ∞ | 0.1 | | | ST |
| S6 | 8.4 | 1.7 | 1.54 | 56 | L3 |
| S7 | −1.6 | 0.1 | | | f3 = 2.6 mm |
| S8 | 11.5 | 1.2 | 1.54 | 56 | L4 |
| S9 | −1.9 | 0.1 | | | f4 = 3.1 mm |
| S10 | −1.8 | 0.5 | 1.64 | 24 | L5 |
| S11 | −7.4 | 1.0 | | | f5 = −4.9 mm |
| S12 | ∞ | 0.3 | | | CF |
| S13 | ∞ | 1.1 | | | |

In this second preferred embodiment, the sag z of the aspheric surfaces S1, S2, S3, S4, S6, S7, S8, S9, S10, and S11 could be obtained by the following equation:

$$z = \frac{ch^2}{1 + \sqrt{1-(1+k)c^2h^2}} + \alpha_2 h^4 + \alpha_3 h^6 + \alpha_4 h^8 + \alpha_5 h^{10} + \alpha_6 h^{12} + \alpha_7 h^{14} + \alpha_8 h^{16}$$

wherein:

z is the sag of the aspheric surface;

c is the curvature of the surface;

h is the semi-diameter of the surface;

k is conic constant;

$\alpha_2$-$\alpha_8$ are coefficients of each order of the semi-diameter h on the surface.

In this second preferred embodiment, the conic constants (k) and the coefficients of each order $\alpha_2$-$\alpha_8$ of each aspheric surface are shown in Table 4.

TABLE 4

| | k | $\alpha_2$ | $\alpha_3$ | $\alpha_4$ | $\alpha_5$ | $\alpha_6$ | $\alpha_7$ | $\alpha_8$ |
|---|---|---|---|---|---|---|---|---|
| S1 | 0.000000 | 0.000802 | −0.000349 | 0.000027 | −0.000001 | 0.000000 | 0 | 0 |
| S2 | −0.747391 | −0.000228 | 0.001367 | −0.001643 | −0.000078 | 0.000009 | 0 | 0 |
| S3 | −10.325418 | 0.028747 | −0.004191 | 0.000169 | 0.000013 | 0.000000 | 0 | 0 |
| S4 | 0.000000 | 0.068650 | 0.076095 | −0.135481 | −0.008466 | 0.000000 | 0 | 0 |
| S6 | 0.000000 | −0.020203 | 0.070289 | −0.152666 | 0.291864 | −0.232651 | 0 | 0 |
| S7 | −0.661205 | −0.015849 | −0.013589 | 0.014230 | −0.008844 | 0.002315 | 0 | 0 |
| S8 | 0.000000 | −0.006132 | −0.001412 | 0.001557 | −0.000099 | 0.000000 | 0 | 0 |
| S9 | 0.000000 | 0.004338 | 0.008231 | −0.000308 | 0.000360 | 0.000000 | 0 | 0 |
| S10 | 0.000000 | 0.023131 | 0.009418 | −0.000739 | 0.000132 | 0.000000 | 0 | 0 |
| S11 | 0.000000 | 0.027074 | −0.001721 | 0.000125 | −0.000041 | 0.000000 | 0 | 0 |

Figure 4A:
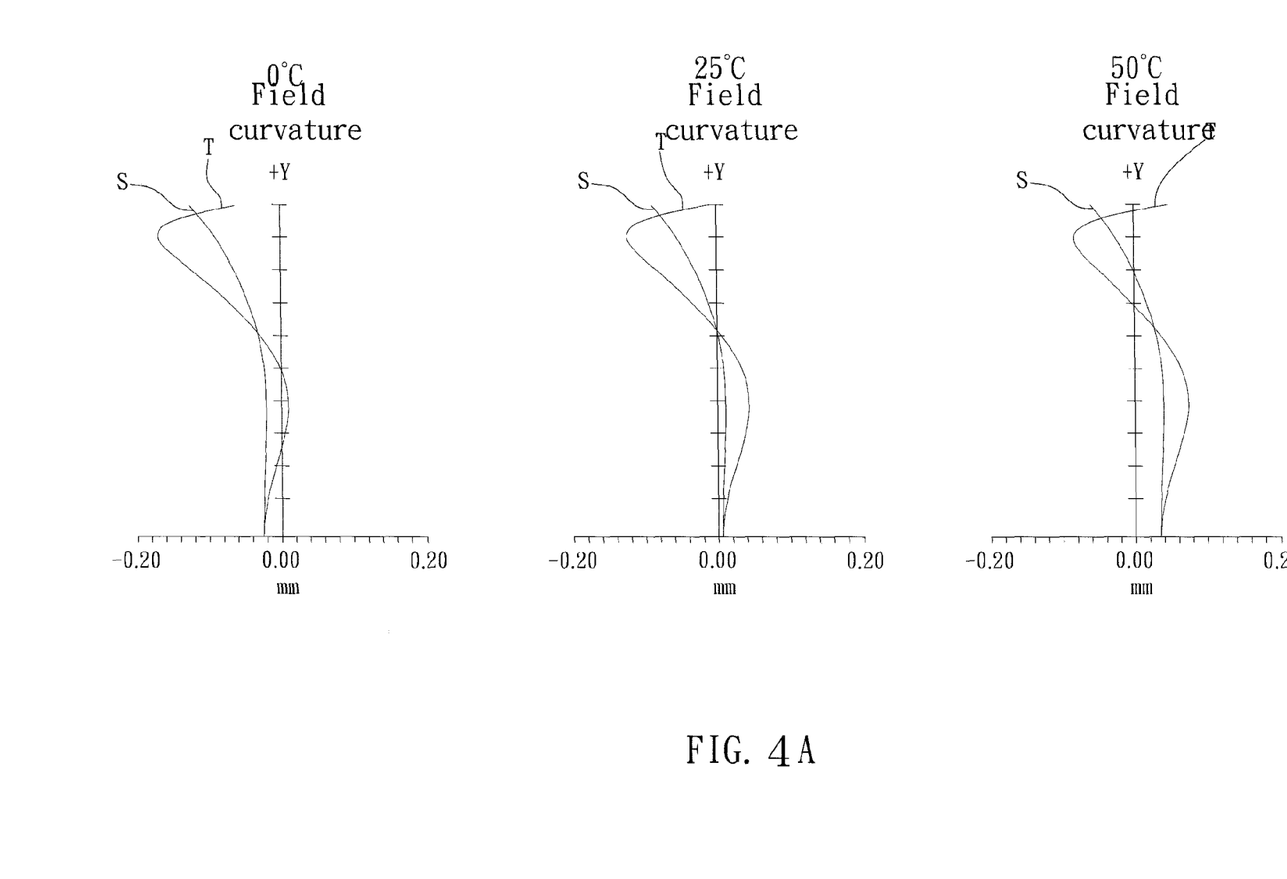
FIG. 4A shows a field curvature diagram of the second preferred embodiment of the present invention.
Figure 4B:
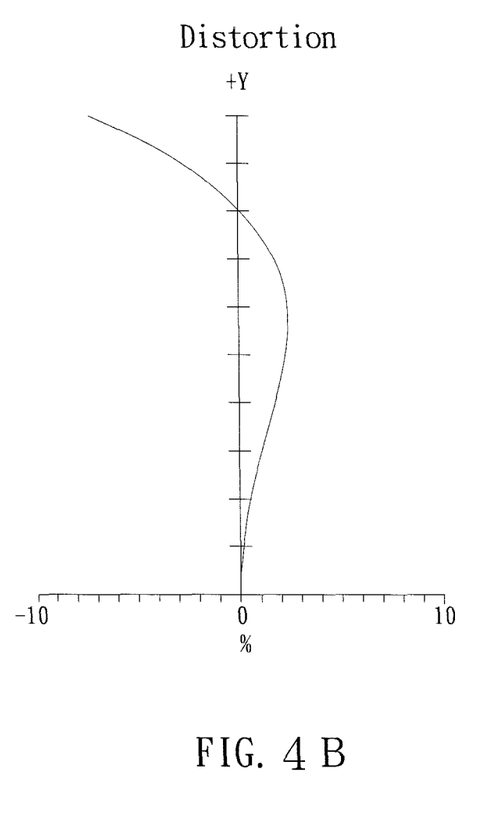
FIG. 4B shows a distortion diagram of the second preferred embodiment of the present invention.
Figure 4C:
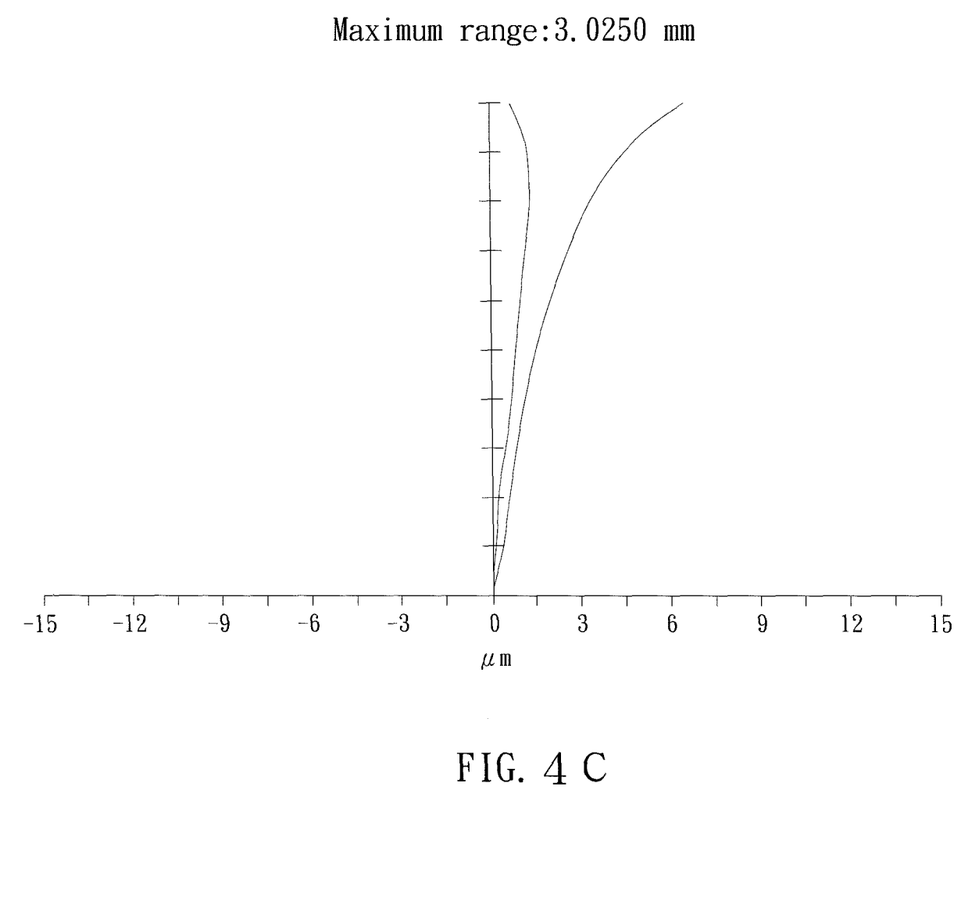
FIG. 4C shows a lateral color aberration diagram of the second preferred embodiment of the present invention.

Through the aforementioned arrangements of the lenses L1-L5 and the apertures ST, the image quality of the miniature image pickup lens 2 could satisfy the demand of the market, which could be realized via FIG. 4A to FIG. 4C. FIG. 4A shows that the maximum field curvature of the miniature image pickup lens 2 no exceeds the range from −0.18 mm to 0.02 mm at 0° C.; −0.14 mm to 0.04 mm at 25° C., and −0.10 mm and 0.08 mm at 50° C. FIG. 4B shows that the maximum distortion of the miniature image pickup lens 2 is no higher than −8% and 3%. As to FIG. 4C, it shows that the maximum lateral color aberration of the miniature image pickup lens 2 is no larger than 7.5 μm. The results show that the optical performance of the miniature image pickup lens 2 complies with the market standard.

[Third Preferred Embodiment]

Figure 5:
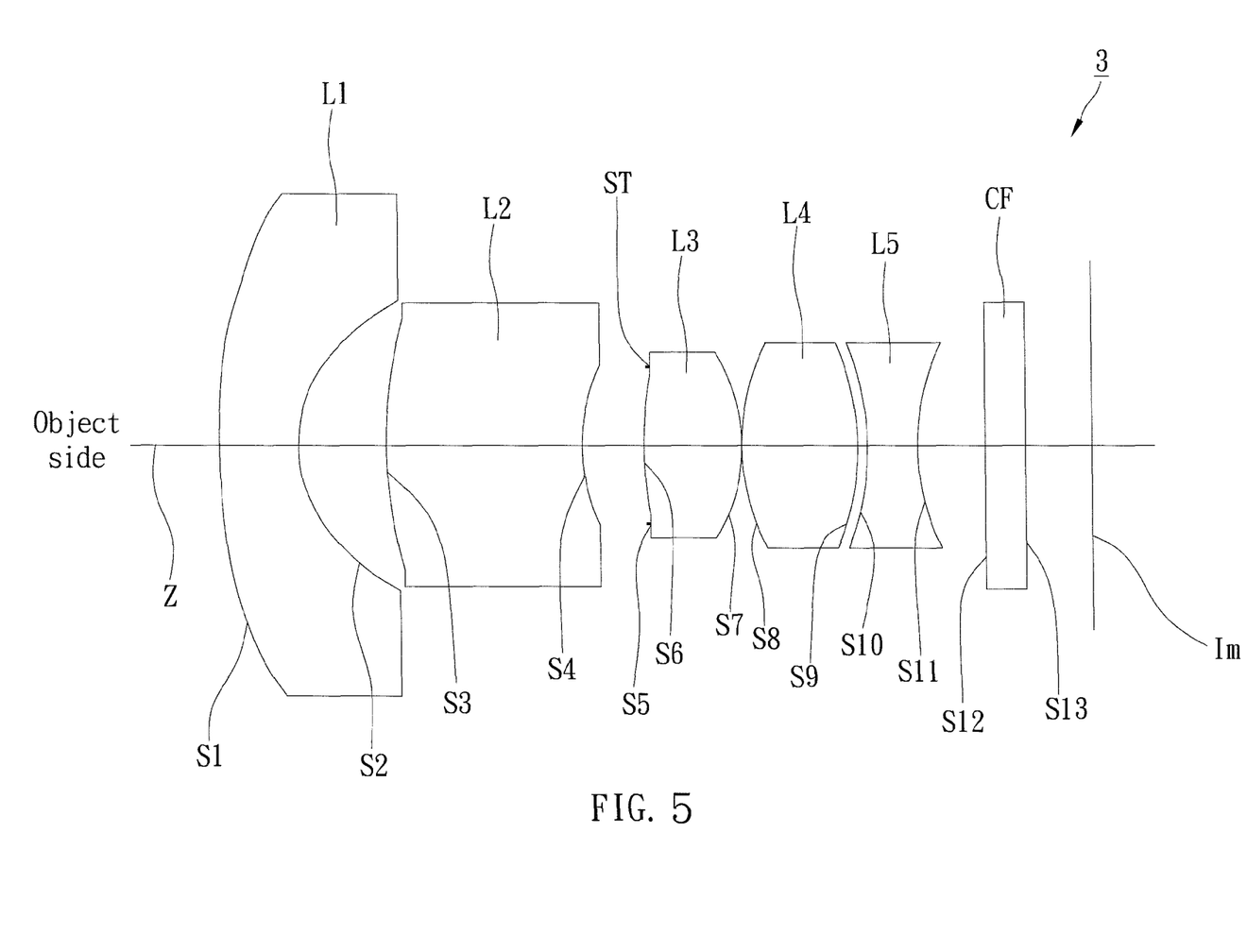
FIG. 5 is a sketch diagram of the arrangement of the lenses of a third preferred embodiment of the present invention.

As shown in FIG. 5, a miniature image pickup lens 3 of the third preferred embodiment of the present invention includes a first lens L1, a second lens L2, an aperture ST, a third lens L3, a fourth lens L4, a fifth lens L5, and an optical filter CF arranged in sequence along an optical axis Z from an object side to an image side Im.

The first lens L1 is a plastic negative meniscus lens with a convex surface S1 towards the object side and a concave surface S2 towards the image side Im, and both the convex surface S1 and the concave surface S2 are aspheric, which makes the miniature image pickup lens 3 wide-angled. The reason for applying such aspheric surfaces is to correct the distortion, which happens easily for the miniature image pickup lens 3 designed as wide-angled.

The second lens L2 is a plastic negative meniscus lens with a convex surface S3 towards the object side and a concave side S4 towards the image side Im, and both the convex surface S3 and the concave surface S4 are aspheric. The second lens L2 is helpful to correct the distortion as well, and also the chromatic aberration caused by the first lens L1.

The aperture ST is set between the second lens L2 and the third lens L3, and the purpose is again the same with the previous two embodiments, which is to lower the angle incident to the image side Im of the light enters the miniature image pickup lens 3, and to symmetrizes the arrangements of the lenses at the opposite sides of the aperture ST. As a result, the luminosity on the image side Im could be increased effectively, the distance between the image plane Im and the lenses L1-L5 could be shortened, and the sensitivity of the miniature image pickup lens 2 while being manufactured could be lowered too.

The third lens L3 is a glass positive biconvex lens with two spherical convex surfaces S6 and S7, which provides the main refractive power of the entire optical system of the miniature image pickup lens 3. Moreover, by applying the glass material, the optical performance of the miniature image pickup lens 3 could be more insensitive to temperature.

The fourth lens L4 is a plastic positive biconvex lens with two aspheric convex surfaces S8 and S9. Due to the fourth lens L4 is a positive lens, it could effectively shorten the total length of the miniature image pickup lens 3 by proper coordinating with the other lenses L1-L3 and L5.

The fifth lens L5 is a plastic negative biconcave lens with two aspheric concave surfaces S10 and S11. Due to the fifth lens L5 is a negative lens while the fourth lens L4 is a positive one, these two lenses L4 and L5 could effectively ameliorate the problem of chromatic aberration which may happen for the miniature image pickup lens 3.

In addition to the aforementioned structures of the lenses L1-L5, the miniature image pickup lens 3 of the present invention further satisfies the following conditions, and again, to make the miniature image pickup lens 3 have the advantages of wide-angle and short total length, and to control the main refractive power of the entire optical system, and to effectively eliminate the chromatic aberration of the miniature image pickup lens 3:

$$0.1 < f/TTL < 0.2; \quad\quad 1)$$

$$0.5 < f/f_3 < 2; \quad\quad 2)$$

$$vd_4 - vd_5 > 20; \quad\quad 3)$$

wherein:

f is a total focal length of the miniature image pickup lens 3;

TTL is a total length of the miniature image pickup lens 3;

$f_3$ is a focal length of the third lens L3;

$vd_4$ is a dispersion index of the fourth lens L4; and $vd_5$ is a dispersion index of the fifth lens L5.

In order to achieve the aforementioned purposes and enhance the optical performance of the miniature image pickup lens 3, Table 5 shows the specifications of the miniature image pickup lens 3 of the third preferred embodiment, including the total focal length of the miniature image pickup lens 3 (f), the total length of the miniature image pickup lens 3 (TTL), the radius of each lens along the optical axis Z (R), the distance between two neighboring surfaces or between the lens and the image side Im along the optical axis Z (D), the refractive index of each lens (Nd), the Abbe number (vd) of each lens, and the focal lengths of each lens (f1-f5):

TABLE 5 f = 2.9 mm TTL = 15.2 mm

| Side | R (mm) | D (mm) | Nd | Vd | |
|---|---|---|---|---|---|
| S1 | 14.0 | 1.4 | 1.54 | 56 | L1 |
| S2 | 2.3 | 1.5 | | | f1 = −5.4 mm |
| S3 | 6.2 | 3.4 | 1.64 | 24 | L2 |
| S4 | 3.8 | 1.2 | | | f2 = −33.7 mm |

TABLE 5-continued

| | f = 2.9 mm TTL = 15.2 mm | | | | |
|---|---|---|---|---|---|
| Side | R (mm) | D (mm) | Nd | Vd | |
| S5 | ∞ | −0.1 | | | ST |
| S6 | 8.1 | 1.7 | 1.54 | 56 | L3 |
| S7 | −3.0 | 0.0 | | | f3 = 4.0 mm |
| S8 | 4.0 | 2.0 | 1.54 | 56 | L4 |
| S9 | −3.3 | 0.1 | | | f4 = 3.7 mm |
| S10 | −3.6 | 0.9 | 1.64 | 24 | L5 |
| S11 | 6.6 | 1.2 | | | f5 = −3.5 mm |
| S12 | ∞ | 0.7 | | | CF |
| S13 | ∞ | 1.2 | | | |

In this third preferred embodiment, the sag z of the aspheric surfaces S1, S2, S3, S4, S8, S9, S10, and S11 could be obtained by the following equation:

$$z = \frac{ch^2}{1 + \sqrt{1 - (1+k)c^2h^2}} + \alpha_2 h^4 + \alpha_3 h^6 + \alpha_4 h^8 + \alpha_5 h^{10} + \alpha_6 h^{12} + \alpha_7 h^{14} + \alpha_8 h^{16}$$

wherein:
z is the sag of the aspheric surface;
c is the curvature of the surface;
h is the semi-diameter of the surface;
k is conic constant;
$\alpha_2$-$\alpha_8$ are coefficients of each order of the semi-diameter h on the surface.

In this third preferred embodiment, the conic constants (k) and the coefficients of each order $\alpha_2$-$\alpha_8$ of each aspheric surface are shown in Table 6.

TABLE 6

| | k | $\alpha_2$ | $\alpha_3$ | $\alpha_4$ | $\alpha_5$ | $\alpha_6$ | $\alpha_7$ | $\alpha_8$ |
|---|---|---|---|---|---|---|---|---|
| S1 | 0.000000 | 0.000000 | 0.003177 | −0.000370 | 0.000029 | −0.000001 | 0.000000 | 0 |
| S2 | −0.443899 | 0.000000 | 0.003461 | 0.000270 | −0.000401 | 0.000092 | −0.000007 | 0 |
| S3 | −22.361359 | 0.000000 | 0.007850 | −0.002579 | 0.000365 | −0.000029 | 0.000000 | 0 |
| S4 | 0.000000 | 0.000000 | 0.004068 | 0.003475 | 0.000801 | 0.000193 | 0.000000 | 0 |
| S8 | 0.000000 | 0.000000 | −0.003732 | 0.001881 | 0.000057 | −0.000154 | 0.000000 | 0 |
| S9 | 0.000000 | 0.000000 | 0.024733 | −0.004342 | 0.000701 | −0.000104 | 0.000000 | 0 |
| S10 | 0.000000 | 0.000000 | 0.031317 | −0.011399 | 0.002546 | −0.000226 | 0.000000 | 0 |
| S11 | 0.000000 | 0.000000 | 0.024117 | −0.006308 | 0.001684 | −0.000140 | 0.000000 | 0 |

Figure 6:
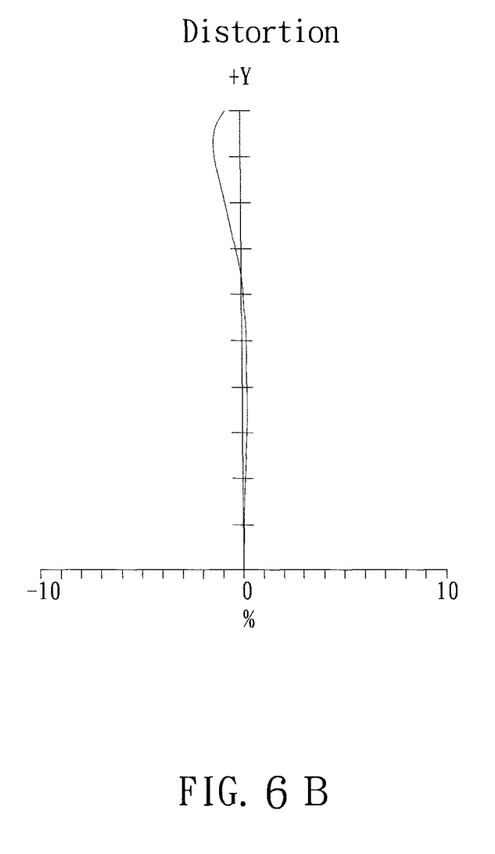
FIG. 6A shows a field curvature diagram of the third preferred embodiment of the present invention.
FIG. 6B shows a distortion diagram of the third preferred embodiment of the present invention.
FIG. 6C shows a lateral color aberration diagram of the third preferred embodiment of the present invention.
Figure 6A:
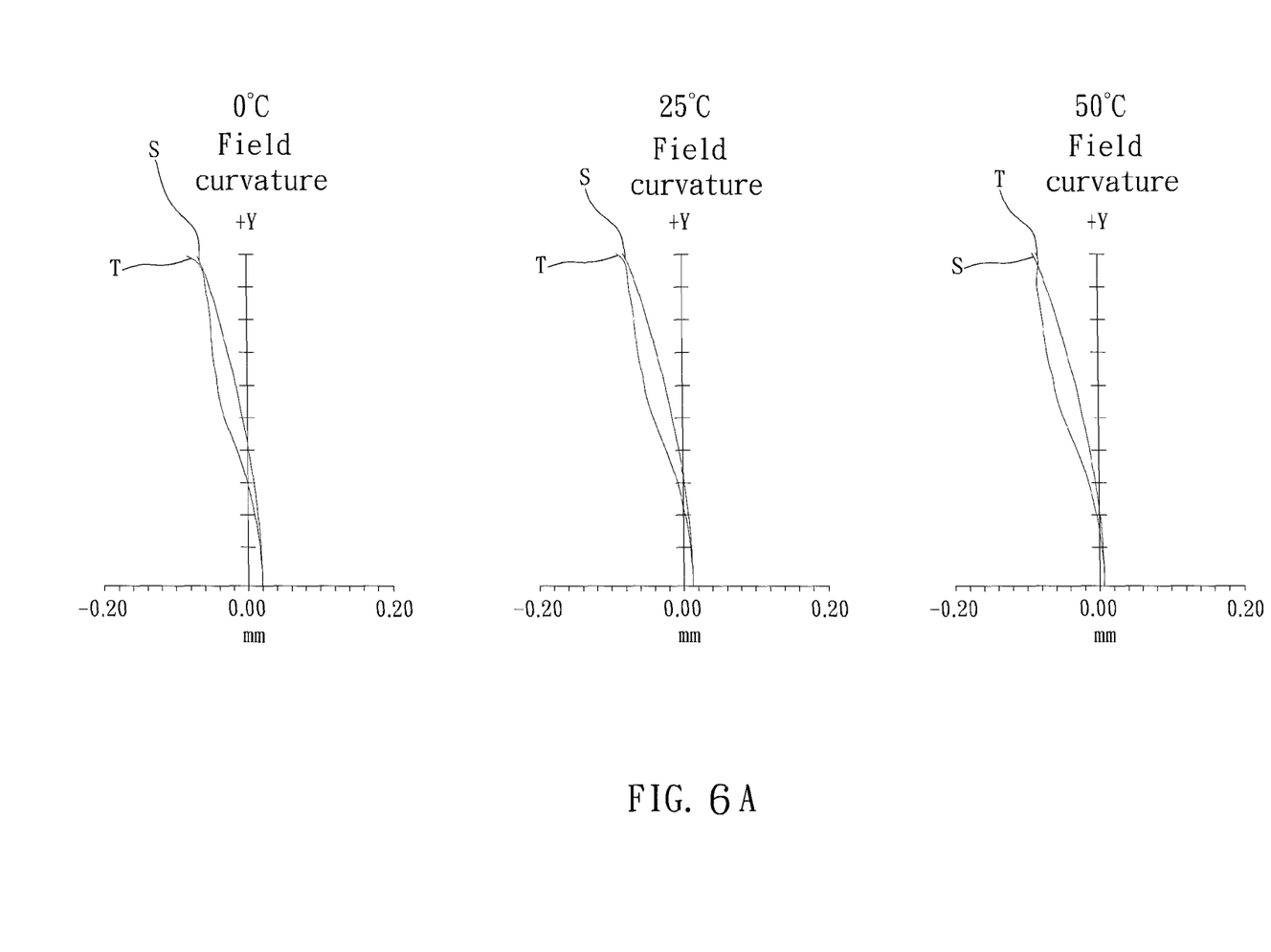
Figure 6C:
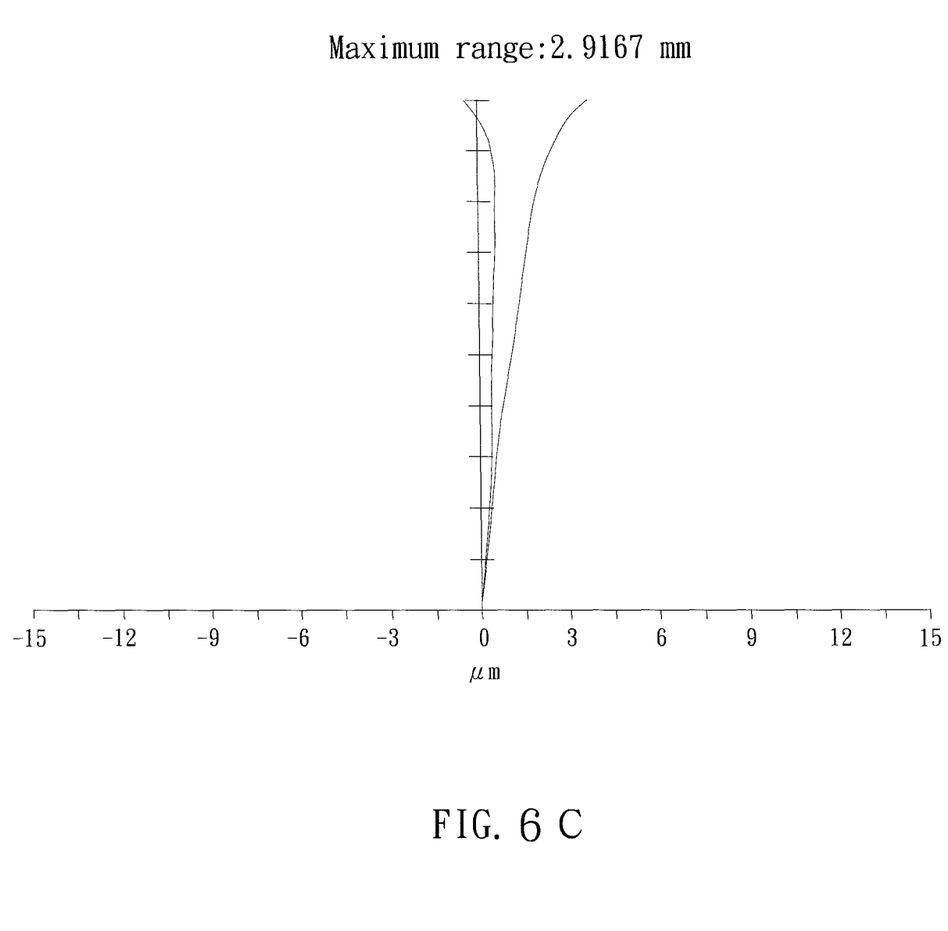

Through the aforementioned arrangements of the lenses L1-L5 and the apertures ST, the image quality of the miniature image pickup lens 3 could satisfy the demand of the market, which could be realized via FIG. 6A to FIG. 6C. FIG. 6A shows that the maximum field curvature of the miniature image pickup lens 3 no exceeds the range from −0.08 mm to 0.02 mm at 0° C.; −0.10 mm to 0.02 mm at 25° C., and −0.10 mm and 0.02 mm at 50° C. FIG. 6B shows that the maximum distortion of the miniature image pickup lens 3 is no higher than −2% and 1%. As to FIG. 6C, it shows that the maximum lateral color aberration of the miniature image pickup lens 3 is no higher than −1.5 μm and 4.5 μm. The results show that the optical performance of the miniature image pickup lens 3 complies with the market standard.

In conclusion, the image pickup lens of the present invention is miniaturized, able to capture wide-angled images, and the captured images have less optical distortion; and higher optical performance. The description above provides a few preferred embodiments of the present invention and the equivalence of the present invention is still in the scope of claim construction of the present invention.

What is claimed is:

1. A miniature image pickup lens, in sequence along an optical axis from an object side to an image side, comprising:
    a first lens, which is a negative meniscus lens with a convex aspheric surface toward the object side and a concave aspheric surface toward the image side;
    a second lens being a meniscus lens and having a convex surface toward the object side, wherein both surfaces of the second lens are aspheric;
    an aperture;
    a third lens, which is a positive biconvex lens;
    a fourth lens, which is a positive biconvex lens, wherein both surfaces of the fourth lens are aspheric; and
    a fifth lens, which is a negative lens with a concave aspheric surface toward the object side and a concave aspheric surface toward the image side, wherein the fourth lens and the fifth lens do not form a compound lens; and
    the miniature image pickup lens satisfies the following conditions:

0.1<f/TTL<0.2

0.5<f/f3<2 where f is a total focal length of the miniature image pickup lens, TTL is a total length of the miniature image pickup lens, and f3 is a focal length of the third lens.

2. The miniature image pickup lens as defined in claim 1, wherein the miniature image pickup lens satisfies the following condition:

vd4−vd5>20 where vd4 is a dispersion index of the fourth lens, and vd5 is a dispersion index of the fifth lens.

3. The miniature image pickup lens as defined in claim 1, wherein the second lens is a positive lens.

4. The miniature image pickup lens as defined in claim 1, wherein the second lens is a negative lens.

5. The miniature image pickup lens as defined in claim 1, wherein the first lens and the second lens are both made of plastics.

6. The miniature image pickup lens as defined in claim 1, wherein the third lens is made of glass.

7. The miniature image pickup lens as defined in claim 1, wherein the third lens is made of plastics.

8. The miniature image pickup lens as defined in claim 1, wherein the fourth lens and the fifth lens are both made of plastics.

9. A miniature image pickup lens, in sequence along an optical axis from an object side to an image side, comprising:
    a first lens, which is a negative meniscus lens with a convex aspheric surface toward the object side and a concave aspheric surface toward the image side;

a second lens being a meniscus lens and having a convex surface toward the object side, wherein both surfaces of the second lens are aspheric;

an aperture;

a third lens, which is a positive biconvex lens, wherein both surfaces of the third lens are aspheric;

a fourth lens, which is a positive biconvex lens, wherein both surfaces of the fourth lens are aspheric; and a fifth lens, which is a negative lens with a concave aspheric surface toward the object side and a concave aspheric surface toward the image side, wherein the fourth lens and the fifth lens do not form a compound lens; and the miniature image pickup lens satisfies the following conditions:

$$0.1 < f/TTL < 0.2$$

$$0.5 < f/f3 < 2$$

where f is a total focal length of the miniature image pickup lens, TTL is a total length of the miniature image pickup lens, and f3 is a focal length of the third lens.

* * * * *